(12) United States Patent
McKinney

(10) Patent No.: US 7,651,608 B2
(45) Date of Patent: Jan. 26, 2010

(54) SYSTEM FOR DENITRIFICATION OF TREATED WATER FROM AEROBIC WASTEWATER TREATMENT SYSTEMS

(76) Inventor: Jerry L. McKinney, P.O. Box 697, Silsbee, TX (US) 77656

( * ) Notice: Subject to any disclaimer, the term of this patent is extended or adjusted under 35 U.S.C. 154(b) by 0 days.

(21) Appl. No.: 12/185,422

(22) Filed: Aug. 4, 2008

(65) Prior Publication Data

US 2008/0283455 A1    Nov. 20, 2008

Related U.S. Application Data

(62) Division of application No. 11/656,167, filed on Jan. 22, 2007, now abandoned.

(60) Provisional application No. 60/760,618, filed on Jan. 20, 2006.

(51) Int. Cl.
*C02F 3/00*    (2006.01)
(52) U.S. Cl. .................. 210/138; 210/143; 210/150; 210/151; 210/220

(58) Field of Classification Search ......... 210/138–140, 210/739, 746, 143, 150–151, 220
See application file for complete search history.

(56) References Cited

U.S. PATENT DOCUMENTS

| | | | |
|---|---|---|---|
| 4,983,285 A | 1/1991 | Nolen | |
| 5,221,470 A | 6/1993 | McKinney | |
| 5,549,818 A | 8/1996 | McGrew, Jr. | |
| 5,785,854 A | 7/1998 | McKinney | |
| 7,258,791 B2 * | 8/2007 | Matsumoto | ............ 210/607 |
| 2002/0121478 A1 | 9/2002 | Bingley | |

OTHER PUBLICATIONS

Biological Wastewater Treatment—Theory and Applications by C.P. Leslie Grady, Jr. and Henry C. Lim, Pollution Engineering and Technology (10 pages).

* cited by examiner

*Primary Examiner*—Chester T Barry

(57) ABSTRACT

An apparatus and method for denitrification of treated wastewater from an aerobic wastewater treatment system in which oxygen levels in the aeration chamber of an aerobic digestion vessel are cycled between an anoxic environment, i.e., when the treated wastewater in the aeration vessel contains from just above 0 to just less than 1 ppm dissolved oxygen to an aerobic environment wherein the treated wastewater in the aeration vessel has a dissolved oxygen content of about 1 ppm or higher.

3 Claims, 4 Drawing Sheets

SYSTEM FOR DENITRIFICATION OF TREATED WATER FROM AEROBIC WASTEWATER TREATMENT SYSTEMS

CROSS REFERENCE TO RELATED APPLICATIONS

This application is a divisional of U.S. patent application Ser. No. 11/656,167 filed on Jan. 22, 2007, now abandoned for Apparatus and Method for Denitrification of Treated Water from Aerobic Wastewater Treatment Systems, and which application claims the priority of U.S. Provisional Application No. 60/760,618 filed on Jan. 20, 2006, the disclosures of which are incorporated herein by reference for all purposes.

BACKGROUND OF THE INVENTION

1. Field of the Invention

The present invention relates to aerobic wastewater treatment systems, particularly residential wastewater treatment systems and, more particularly, to the denitrification of treated wastewater from such aerobic wastewater treatment systems.

2. Description of Prior Art

Typical residential aerobic wastewater treatment systems comprise a pre-treatment vessel or tank, an aerobic digestion vessel or tank and a pump vessel or tank. In operation, the raw wastewater, which can be a mixture of so-called black water and grey water from a residence flows to the pre-treatment tank where the bulk of the solids settle out. The largely solids free water from the pre-treatment tank flows into the aerobic digestion tank where under the influence of an oxygen containing gas, the bacteria aerobically digests the organic solids carried over from the pre-treatment tank. Most aerobic digestion tanks (aeration tank) are comprised of a so-called aeration chamber and a clarifier chamber, digestion of the suspended and dissolved organic solids being conducted in the aeration chamber, substantially clarified water being removed from the clarifier chamber which then flows by gravity into the pump tank, a holding tank or in some cases for direct disposal.

Wastewater generally contains large amounts of nitrogen in the form of nitrates ($NO_3^-$), nitrites ($NO_2^-$), ammonia ($NH_4^+$) and nitrogen gas ($N_2$). All these forms of nitrogen are biochemically interconvertible, the former three being nitrogen nutrients. Nitrogen nutrients from wastewater can lead to the nutrient enrichment of water bodies causing excessive growth of aquatic plants (algae). The dissolved oxygen in the water body becomes depleted when the aquatic plants die, fall to the bottom and then are decomposed by bacteria. The oxygen depletion can reduce the population of indigenous fish and other oxygen-consuming organisms. Nitrogen nutrients from wastewater have also been linked to ocean "red tides" that poison fish and cause illness in humans. Lastly, nitrogen nutrients in drinking water may contribute to miscarriages and is known to be the cause of a serious illness in infants called "Blue Baby Syndrome". Of the nitrogen nutrients, nitrates cause the greatest problem.

Accordingly, it is important for aerobic wastewater treatment system to produce treated wastewater which, to the extent possible, is nitrogen nutrient poor and, in particular, contains the minimum possible amount of nitrates.

It is known that there are denitrifying bacteria that can convert dissolved nitrate into harmless nitrogen gas. For denitrifying bacteria to work, several things are required: (1) a source of energy, e.g., organic material, (2) an anoxic environment (one with little to no dissolved oxygen present), (3) nitrates, and (4) efficient mixing and residence time.

To deal with the problem of producing nitrogen nutrient and more particularly nitrate-free treated wastewater from aerobic wastewater treatment plants, it has been proposed to recycle a portion of the effluent from the pump tank to the pre-treatment tank. Although in the pretreatment tank there is sufficient energy available in the form of organic matter, and nitrogen nutrients are plentiful, it is difficult to ensure that the system is anoxic. Further, the mixing/residence time between the denitrifying bacteria and the recycled nitrates are in question. In any event, it has generally been accepted that this method results in reduced nitrogen nutrients, particularly nitrate content in the treated wastewater which is removed from the system.

A typical residential aerobic wastewater treatment plant has a treatment capacity of 500 gallons a day. In the prior art system, recycle of too large of a volume of the treated wastewater from the pump tank to the pretreatment tank can overload the clarifier tank. However, conventionally prior art systems operate in this manner. In this regard, this recycle occurs whenever the pump in the pump tank is discharging the treated wastewater from the pump tank.

Accordingly there is clearly a need for a more efficient and reliable method and/or apparatus for denitrifying treated wastewater from aerobic wastewater treatment systems.

SUMMARY OF THE INVENTION

According to one aspect of the present invention, treated wastewater from an aerobic wastewater treatment system (AWTS) is analyzed for a given set of conditions specific to the AWTS to determine total nitrogen nutrients, i.e., the sum of nitrates, nitrites and ammonia. Based on the amount of total nitrogen nutrients present in the effluent, a compressor, pump or the like which supplies air or other oxygen-containing gas to the aeration chamber of an aerobic wastewater treatment plant is cycled to alternatively provide an anoxic environment and an aerobic environment in the aerobic chamber for predetermined periods of time. This cycling is conveniently controlled by a timer/controller connected to the pump and can vary, both as to frequency and duration, depending upon a variety of empirically observed parameters of the particular AWTS.

In another aspect of the present invention the pump compressor which is used to introduce the oxygen-containing gas into the aeration chamber is connected to a by-pass circuit having an inlet, an outlet, a first branch and a second branch. The inlet is connected to the pump. Disposed in the first branch is a solenoid valve while a flow restrictor, e.g., an orifice plate or the like, is disposed in the second branch. The outlet from the by-pass circuit is connected to a feedline which in turn is connected to a diffuser disposed in the aeration chamber. In this embodiment, the pump or compressor runs continuously meaning that when the solenoid valve is open in the first branch, air flow enters the feedline substantially unabated and is subsequently ejected into the treated wastewater and the aeration chamber through the diffuser. When the solenoid is in the closed position, flow through the first branch is stopped but, since the pump is running continuously, a reduced flow of oxygen-containing gas passes through the second branch containing the flow restrictor to ensure that at least some oxygen-containing gas is entering the aeration chamber through the diffuser thereby ensuring that there is sufficient turbulence in the aeration chamber to prevent the settling of any solids in the treated wastewater in the aeration chamber. In this embodiment as noted, the pump runs continuously ensuring that at all times there is mixing of solids in the aeration chamber. A timer/controller is connected to the solenoid valve and depending upon empirically derived conditions for the AWTS, opens and closes the solenoid valve to cycle the treated wastewater in the aeration chamber between alternate aerobic and anoxic/denitrification environments.

In yet another embodiment of the present invention, there is a dissolved oxygen (DO) probe disposed in the aeration chamber and connected to a DO controller. The DO controller in turn is connected to the pump or compressor and is also connected to a timer. In an alternative embodiment, the DO controller can be connected to a system monitor which can set off an alarm, advise regulatory authorities of a variety of aspects of the particular AWTS, etc. In this embodiment, the timer/controller serves to determine macro denitrification and aerobic treatment periods. Thus, the timer/controller can be programmed, again based on empirical measurements as described above made on the particular AWTS system, so as to establish the relative lengths of the denitrification period and the aerobic digestion period. Thus, by way of example only, the timer/controller in communication with the DO controller can signal the pump to turn on for one hour during the aerobic treatment periods or cycle and turn off for two hours during the denitrification cycle. However, during those respective cycles, the DO controller via the DO probe is determining the DO in the aeration chamber. Depending upon which cycle the system is in, i.e., the denitrification cycle or the aerobic treatment cycle, the DO controller, based on the measurement of DO in the water in the aeration chamber, will periodically turn the pump on and off so as to, in the denitrification cycle, maintain the oxygen level between zero and 1 part ppm, i.e., greater than 0 and less than 1 ppm (anoxic condition) and, during the aerobic treatment cycle, maintain the DO level in the water in the aeration chamber above 1, preferably between 1 and 4 ppm. Thus, the DO controller in conjunction with the DO probe acts as a micro or fine tuner of the system in both the denitrification and aerobic treatment cycles.

In still another embodiment of the present invention, a variation of two of the above described embodiments is employed. In this embodiment, there is a by-pass circuit as described above as well as a DO probe, a DO controller, and a timer. In this embodiment, the DO controller is connected to the solenoid valve rather than the pump, the pump running continuously. Accordingly, if, for example, during a denitrification cycle the DO controller in combination with the DO probe detects excess oxygen rendering the system aerobic and therefore unsuitable for denitrification, the DO controller will close the solenoid valve until the oxygen level in the denitrification cycle returns to the desired level, i.e., between just greater than zero and just less than 1 ppm. Conversely, in the aerobic treatment cycle, should the DO controller detect anoxic conditions in the aeration chamber, the solenoid valve would be open to allow full flow of oxygen-containing gas into the aeration chamber. Additionally, as discussed above, the DO controller can be used in this embodiment to ensure that the amount of DO does not exceed a desired level, e.g., about 3 ppm. In this embodiment, since the pump is running continuously, circulation of solids in the aerobic chamber continues, minimizing settling of the solids.

DESCRIPTION OF THE PREFERRED EMBODIMENTS

Figure 1:
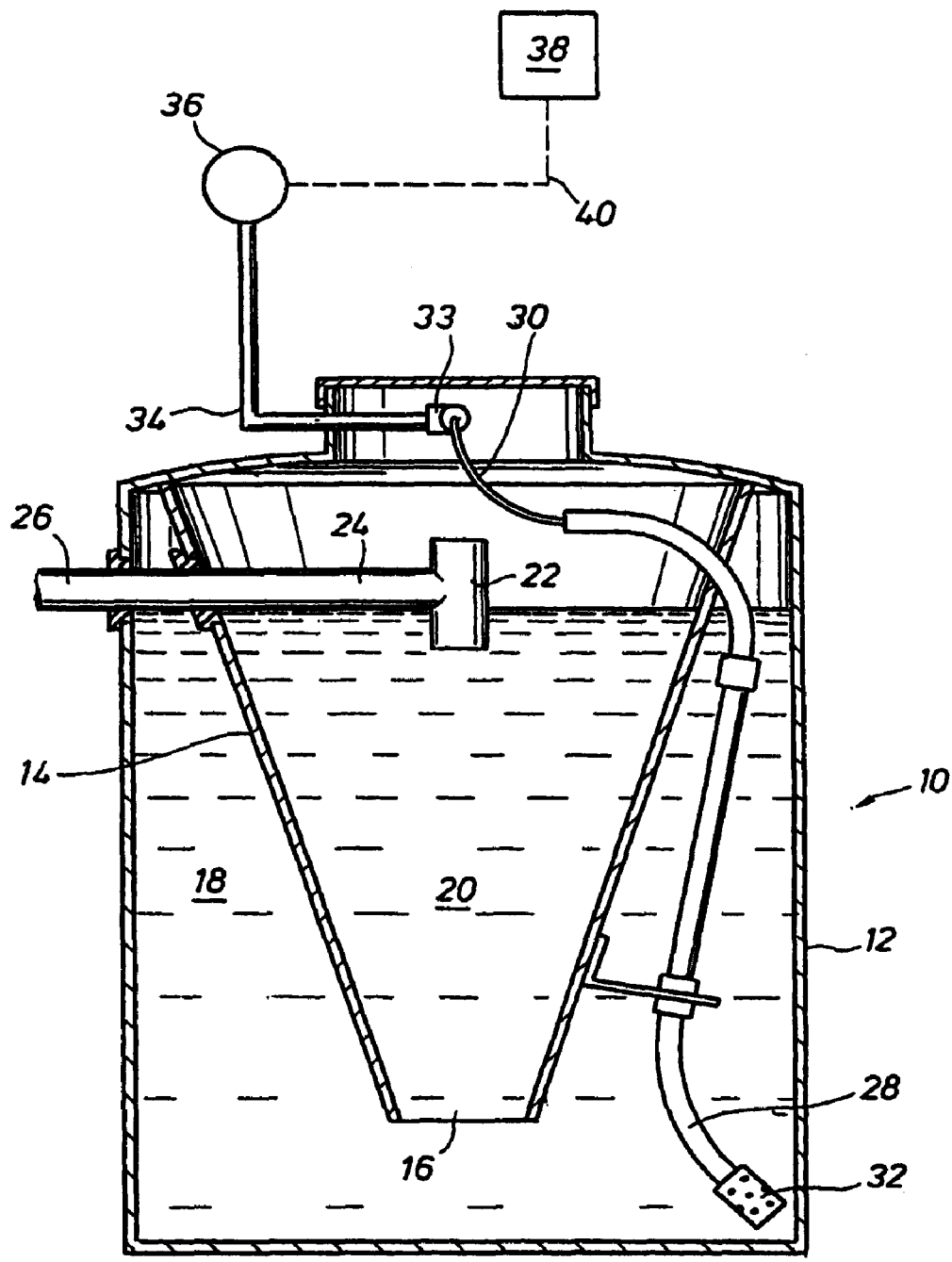
FIG. 1 shows a typical aeration vessel used in a typical AWTS in conjunction with a pump and timer, shown schematically.

As noted above, a typical residential AWTS has a throughput of roughly 500 gallons a day. Typical AWTS's are shown, for example in U.S. Pat. Nos. 5,221,470 and 5,785,854, both of which are incorporated herein by reference for all purposes. Clearly, this throughput can, within limits, be greater but more frequently is less. In any event, as noted above, total nitrogen nutrients (nitrates, nitrites and ammonia) in the effluent from the AWTS must, in most jurisdictions, be below some level, e.g., 10 ppm or less. To determine this, the effluent from the clarifier, the pump tank, etc., i.e., the treated wastewater, can be sampled and tested by methods well known to those skilled in the art to determine total nitrogen nutrients. These tests to determine total nitrogen nutrients in the treated wastewater are done at intervals which vary from jurisdiction to jurisdiction, if total nitrogen nutrients in the treated effluent is of concern in that jurisdiction.

It is well known that ensuring that the level of total nitrogen nutrients does not exceed the desired level is, in most cases, difficult to achieve. In this regard, and for the most part, once an AWTS has been subjected for certification by a certifying group such as NSF and passes on the basis of total nitrogen nutrients and other necessary conditions that the system must meet, it is simply assumed that all AWTS's which duplicate the certified AWTS will perform in that manner. Clearly, this is not true because of the many variables affecting nitrogen nutrient production.

In a given AWTS system installed at a given site, some of the possible variables to contend with in determining total nitrogen nutrients, or for that matter whether the treated wastewater has been aerobically treated sufficiently, include:
  Total gallons of flow through the AWTS
  Flow pattern over 24 hours
  Total nitrogen or waste convertible to total nitrogen nutrients in the wastewater to be treated
  pH of the wastewater
  Site elevation
  Temperature conditions at the site where the AWTS is installed
  BOD of wastewater to be treated
  Efficiency of the aeration system Nonetheless, for a given AWTS at a specific site, the present invention contemplates determining a mode of operating the system such that denitrification occurs with a relative degree of certainty to achieve effluent having a desired level of nitrogen nutrients. In this aspect of the invention, various parameters such as flow rate, temperature, etc., for the specific AWTS are determined. For example, total nitrogen nutrient levels in the effluent are determined for various flow rates through the specific AWTS. Depending upon the determined values for total nitrogen nutrients versus a given flow rate, an empirical relationship between flow rate and nitrogen nutrients produced by the AWTS can be determined. Likewise, a similar procedure can be conducted for other variables such as temperature, the nature of the wastewater to be treated, etc. Based on this empirical analysis, a simplified system and method can be employed that, within the parameters measured on the specific AWTS system, provides a reasonable expectation that the desired degree of denitrification will occur.

Referring then to FIG. 1, there is shown an aeration vessel 10 having a cylindrical wall 12. Disposed in aeration chamber 10 is an inverted frustoconical partition 14 having an open mouth 16. Partition 14 serves to divide aeration chamber 10 into an aeration chamber 18 and a clarifier chamber 20. As is well know to those skilled in the art, clarified water passes from aeration chamber 18 into clarifier chamber 20 through overflow 22 and outlet 24 into a pump tank or the like. Aeration chamber 10 is also provided with an inlet 26 through which untreated wastewater is introduced.

Disposed in aeration chamber 18 is an aeration apparatus comprised of a rigid tube 28 mounted therein and through which extends a flexible tubing 30, flexible tubing 30 being connected to a diffuser 32 located near the bottom of aeration vessel 10. Tubing 30 is in turn connected via a manifold 33 and conduit 34 to an air pump or compressor 36 which in turn is connected to a power source not shown. A timer/controller 38 communicates via a line 40 with pump 36. Having determined, as described above, total nitrogen nutrients in the effluent from the system shown in FIG. 1 under various conditions, as described above, timer/controller 38 can be set to cycle pump 36 on and off for various periods of time in order to obtain the desired level of denitrification for the specific AWTS. For example, the empirical data may determine that pump 36 should be set to run so as to be on two hours and off one hour. Alternatively, the data may show that because of the pattern of usage of the AWTS system shown in FIG. 1, the pump should be run continuously during daytime hours and left off during nighttime hours. Again, cycling of the pump between an on and off condition for whatever periods of time will be determined by the conditions under which the specific AWTS is operating.

Thus, in one embodiment the present invention contemplates measuring total nitrogen nutrients in the effluent for a specific AWTS under various operating conditions; determining an optimum amount of aeration to achieve a desired level of total nitrogen nutrients in the effluent from the AWTS, and using a timer/controller to control an air pump or compressor to selectively aerate for a predetermined period of time to alternatively create anoxic and aerobic environments in the aeration chamber of an aeration vessel.

Figure 2:
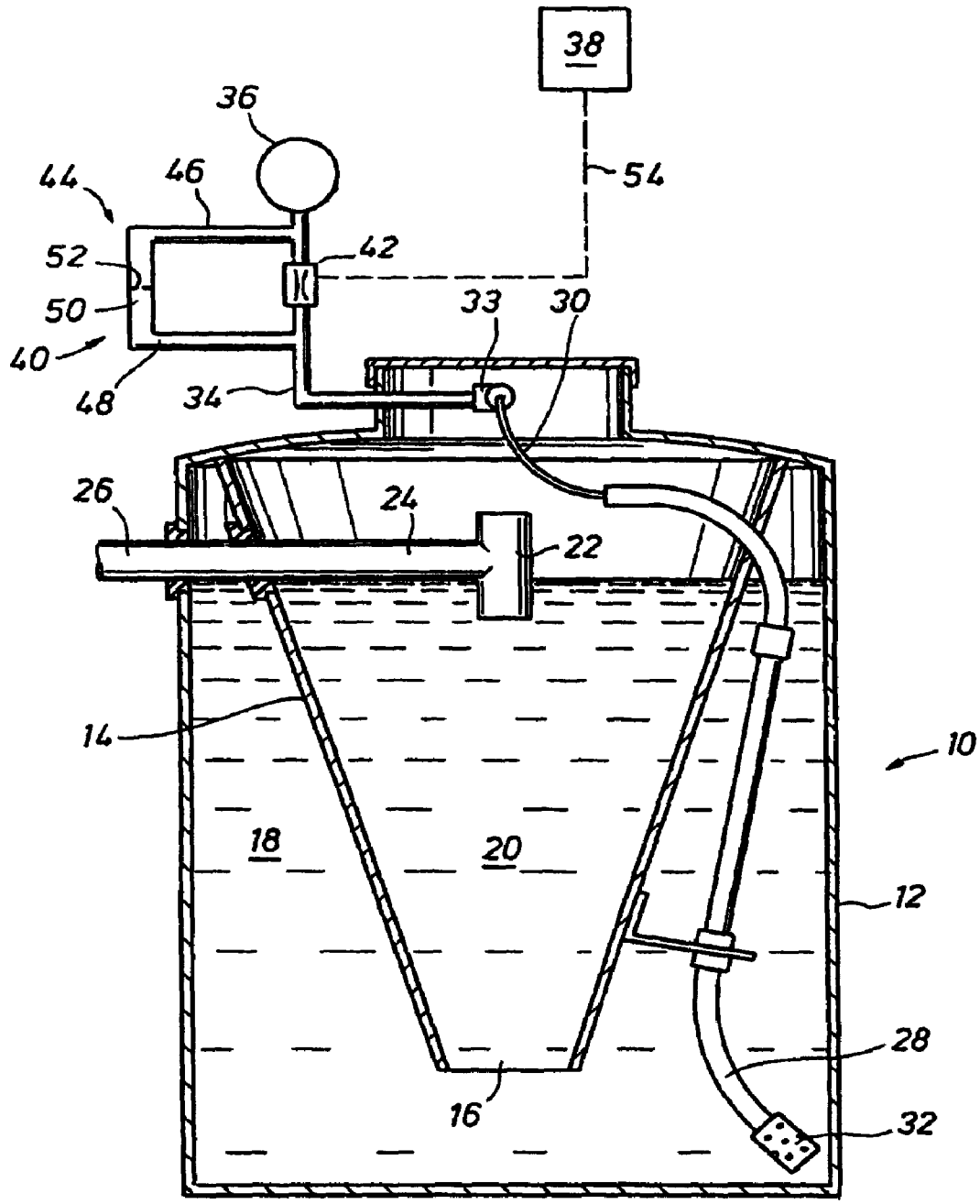
FIG. 2 shows another embodiment of the present invention, and in addition to the aeration vessel of an AWTS, shows a by-pass circuit connected between the pump and the air diffuser as well as a timer/controller connected to a solenoid valve forming part of the by-pass circuit.

Referring now to FIG. 2 there is shown another embodiment of the present invention. The aeration vessel 10 shown in FIG. 2 is substantially the same as that shown in FIG. 1. The embodiment shown in FIG. 2 differs from that shown in FIG. 1 in that there is a by-pass circuit shown generally as 40 disposed between pump 36 and diffuser 32. Specifically, by-pass circuit 40 is comprised of a solenoid valve 42 disposed in conduit 34 and a by-pass loop shown generally as 44 having a first branch 46 connected to conduit 34 upstream of solenoid valve 42 and a second branch 48 connected to conduit 34 downstream of solenoid valve 42. A connecting line 50 between branch line 46 and branch line 48 has disposed therein an orifice plate 52 or some other suitable flow restrictor. In operation, with solenoid valve 42 open, flow from pump 36 to aerator 32 via conduit 34 is essentially unrestricted. However, if solenoid valve 42 is now closed, flow from pump 36 passes through the by-pass loop 44 and more specifically through lines 46, 50, 48 and flow restrictor 52. It will thus be appreciated that significantly less air flow is now passing into line 34 and hence into diffuser 32.

Solenoid valve 42 is connected via line 54 to timer/controller 38. In the embodiment shown in FIG. 2, pump 36 runs continuously. Timer/controller 38, again based on empirical measurements as described above with respect to a specific AWTS, is set to cycle solenoid valve 42 so as to selectively open and close solenoid valve 42 for specified periods of time depending upon empirically derived data as determined with respect to the embodiment shown in FIG. 1. Unlike the embodiment shown in FIG. 1, in the embodiment shown in FIG. 2, pump 36 runs continuously rather than being cycled on and off. However, when solenoid valve 42 is closed, flow to aeration chamber 18 is reduced from that when solenoid valve 42 is open. Although the flow is reduced and therefore insufficient to create an aerobic environment in aeration chamber 18, it is sufficient to keep the undigested solids in aeration chamber 18 from settling and thereby increase the efficiency both of the denitrification cycle and the aerobic treatment cycle. As was discussed above with respect to the embodiment of FIG. 1, the programming of timer/controller 38 vis-à-vis determining when solenoid valve 42 is open or closed, is based on determining the specific characteristics of the AWTS. Also, as noted above, by making the empirical measurements described above with respect to the embodiment of FIG. 1, it can be determined with reasonable certainty how solenoid valve 42 should be cycled as to when and for how long solenoid valve 42 should be either opened or closed. Thus, for example, and again depending upon the empirical measurements, it may be determined that timer/controller 38 should be programmed such that solenoid valve 42 is opened during the daytime hours and closed during the nighttime hours. Alternatively, it may be determined that solenoid valve 42 should be opened for two hours and closed for two hours and that cycle repeated. It should be observed that in the embodiment of FIG. 2 wherein there is always some flow of oxygen-containing gas to the aerobic chamber 18, the efficiency of denitrification is greatly increased. When, for example, the aeration chamber is anoxic, i.e., with a DO of between just above zero and just below 1 ppm, the denitrifying bacteria attack the nitrogen compounds to reduce total nitrogen nutrients. Important to that function is that the undissolved solids in the aerobic chamber where the denitrification is occurring not be allowed to settle as it dramatically decreases the efficiency of the denitrification, i.e., surface contact is important to denitrification. Since, even when solenoid valve 42 is closed some flow to aerobic chamber 18 is occurring, undigested solids in chamber 18 will not be allowed to settle and accordingly the efficiency of the denitrification during the denitrification cycle will be enhanced, at least partly because of increased surface area of the solids which can be contacted by the denitrifying bacteria.

Figure 3:
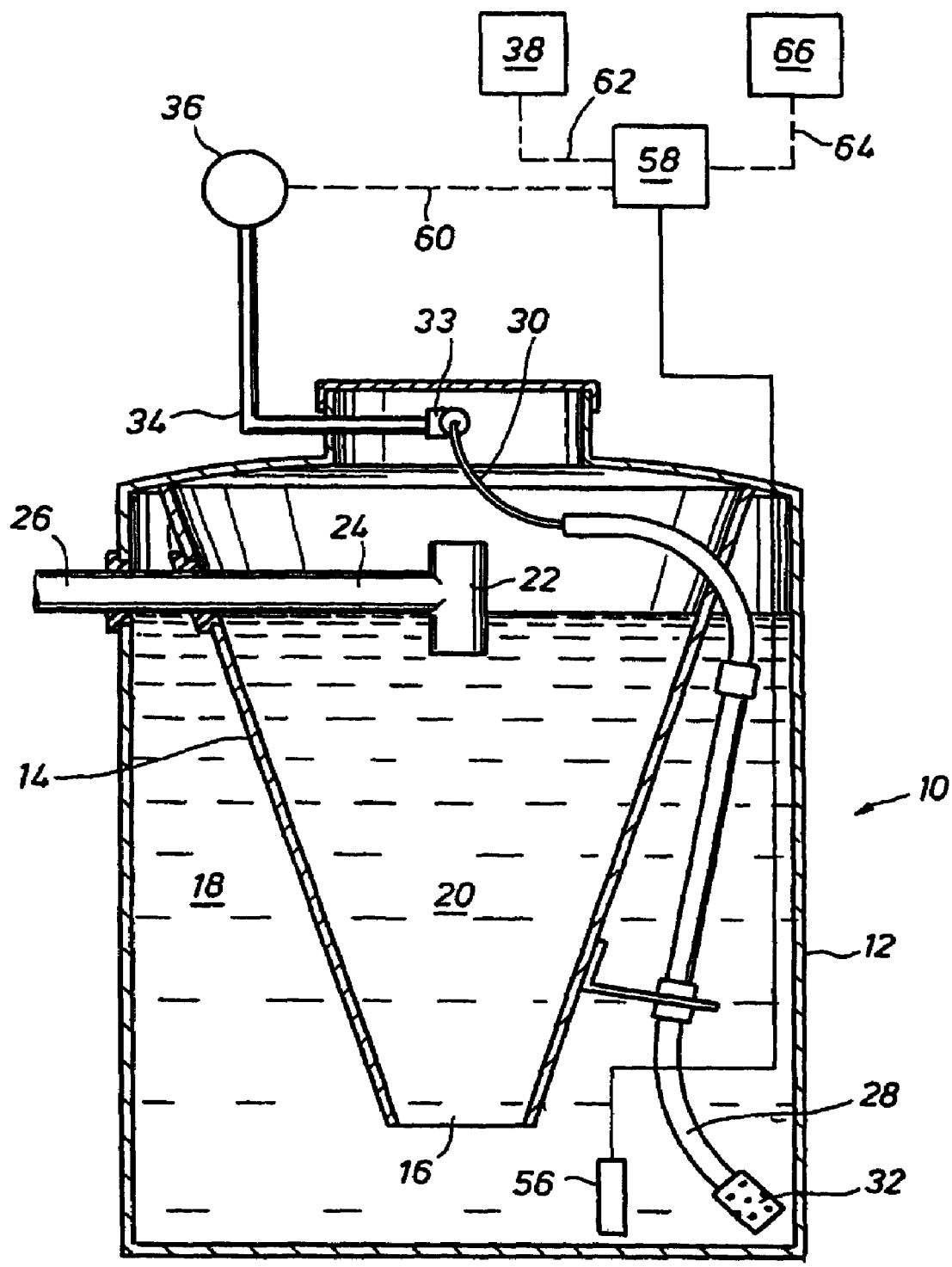
FIG. 3 shows an aeration vessel together with a DO probe, a DO controller, a timer/controller and a system monitor.

Turning now to FIG. 3, there is shown yet another embodiment of the present invention. In addition to a timer/controller 38 as described above with respect to the other embodiments, the embodiment shown in FIG. 3 also includes a DO probe 56 to measure DO in aerobic chamber 18, DO probe 56 being connected to pump 36 and to timer/controller 38 by connecting lines 60 and 62, respectively. DO controller 58 is also connected by a connecting line 64 to a system monitor 66.

In the embodiment shown in FIG. 3, timer/controller 38 determines, in a macro manner, when the system is to be in the denitrification mode or in the aerobic treatment mode. Thus, timer/controller 38 could be programmed for predetermined periods of time for those modes. Timer/controller 38 communicates to DO controller 58 that the system is to be either in a denitrification mode for a predetermined amount of time or an aerobic treatment mode for a predetermined amount of time. Again, timer/controller 38 will signal DO controller 58 how long each of the cycles, i.e., denitrification or aerobic treatment, should last again depending upon empirical measurements that determine in a macro sense how a given AWTS operates to produce effluent with the desired level of nitrogen nutrients. For example, if on a given AWTS system it is determined from the empirical measurements discussed above that the denitrification cycle should last for one hour and the aerobic treatment cycle should last for three hours, then timer/controller 38 would be programmed for one hour/ three hour cycling. Accordingly, to initiate the one hour (denitrification cycle) the timer/controller 38 may communicate to DO controller 58 to turn the pump 36 off. If during that one hour denitrification cycle, the DO in chamber 18 drops to a level of less than 0.1 ppm as determined by DO probe 56, then DO controller 58 signals the pump 36 to turn on. Thus, during the one hour period (the denitrifying cycle), the DO controller 58 in conjunction with DO probe 56, constantly monitors the DO in chamber 18 and in response to that measurement maintains a desired DO level in chamber 18, by cycling pump 36, to maintain the DO in chamber 18 between just greater than zero, e.g., about 0.1 to just less than 1, e.g., 0.9 ppm. In this regard, the DO controller 58 in conjunction with DO probe 56 and pump 38 act in a micro manner to maintain the desired level of DO in the aeration chamber 18, i.e., DO controller 58 can override timer/controller 38 during the macro periods of operation programmed by timer/controller 38.

At the end of the denitrification cycle, the system now switches to the aerobic treatment cycle and as per the example above, for a three hour period, the DO controller 58 will control the operation of pump 36 such that the DO in chamber 18 is at least 1 ppm but not greater than some preselected higher value of DO, e.g., 3 ppm. As a practical matter, and as well known to those skilled in the art in an AWTS, when the DO in the aerobic chamber 18 exceeds 1 ppm it is essentially wasted to the extent that it does not contribute to the aerobic treatment.

In the embodiment shown in FIG. 3, the timer/controller 38 is controlling the DO controller 58 in the sense that it determines the macro length of the cycle of the denitrification period and the macro length of the cycle of the aerobic treatment. It further communicates to the DO controller 58 that within those respective cycles, the DO controller 58 must activate and deactivate pump 36 so as to maintain the system anoxic during the denitrification cycle and aerobic during the aerobic treatment cycle. Thus, timer/controller 38 communicates to DO controller 58 the length of time during which it will maintain the system anoxic and the length of time that it will maintain the system aerobic. However, in those respective macro, time periods, the DO controller 58 can override timer/controller 38 and turn pump 36 on and off so as to maintain those respective states, i.e., anoxic or aerobic. Thus, timer/controller 38 has no direct connection to pump 36, pump 36 being controlled via DO controller 58.

It will be understood that depending upon empirical measurements of total nitrogen nutrients in the effluent, the cycles of denitrification and aerobic treatment can be changed as desired. This could mean that denitrification would occur primarily in the early hours of the morning whereas aerobic treatment would occur primarily during the day.

Figure 4:
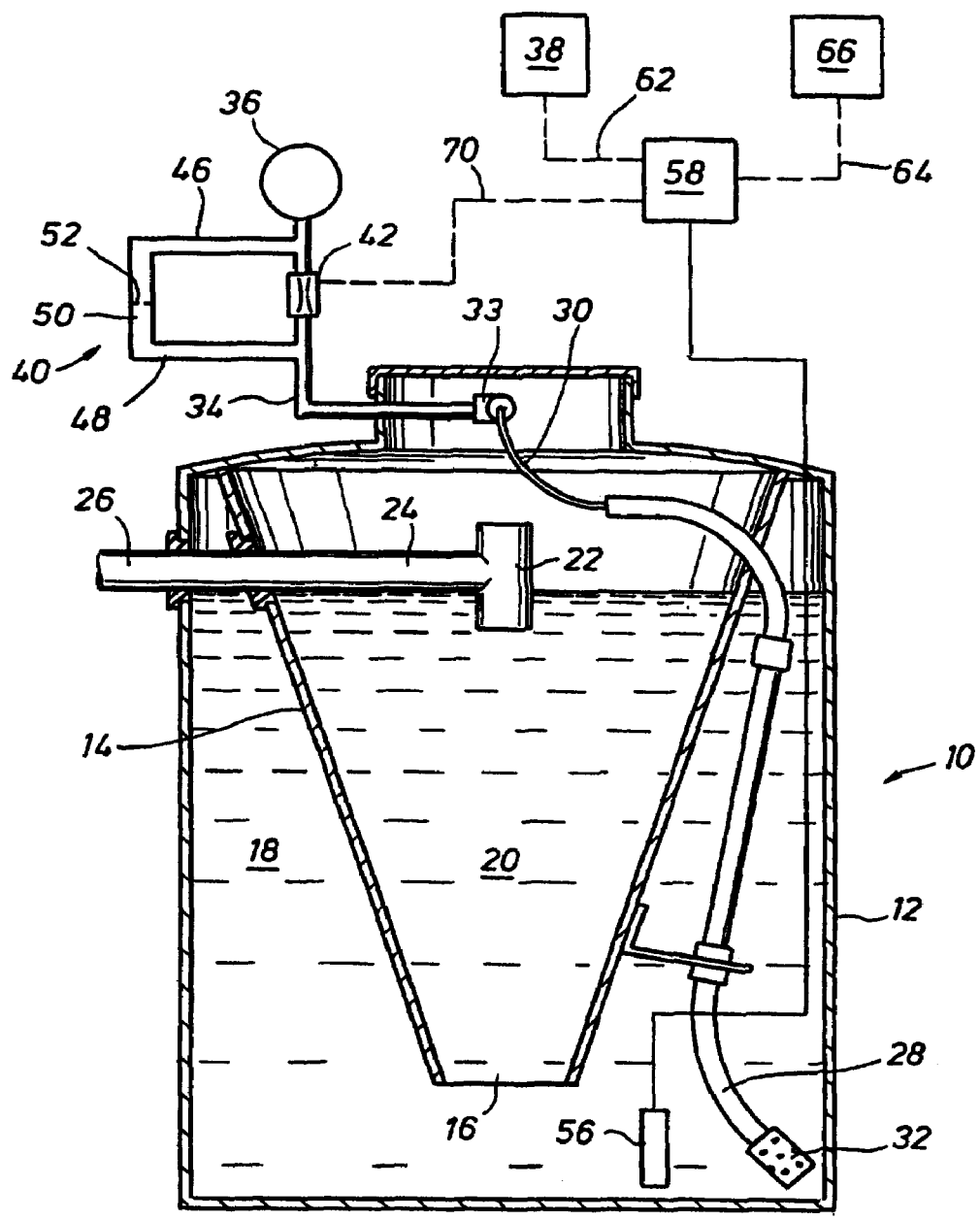
FIG. 4 shows another embodiment of the present invention including an aeration vessel, a by-pass circuit such as shown in FIG. 2, but in addition shows a DO probe, a DO controller, a timer/controller and a system monitor as shown in FIG. 3.

Turning now to FIG. 4, there is shown yet another embodiment of the present invention. In essence, the embodiment shown in FIG. 4, is somewhat of a combination of the embodiments of FIG. 3 and FIG. 2.

In the embodiment shown in FIG. 4, DO controller 58 is connected via a line 70 to solenoid valve 42. Thus, unlike the system shown in FIG. 3, in the embodiment of FIG. 4, DO controller 58 communicates with solenoid valve 42 and not pump 36. The operation of the system shown in FIG. 4 is similar to that described above with respect to the embodiment of FIG. 3 in the sense that timer/controller 38 communicates with DO controller 58 to instruct DO controller 58 regarding the macro lengths of the denitrification and aerobic treatment cycles. Thus the discussion above with respect to the embodiment of FIG. 3 regarding the communication between pump 38 and DO controller 58 is applicable to the embodiment of FIG. 4 as well. However, unlike the embodiment shown in FIG. 3 wherein at certain times the pump 36 will not be operating, in the embodiment shown in FIG. 4, pump 36 continues to operate much like the embodiment shown in FIG. 2. To control the amount of oxygen introduced into aerobic chamber 18, the by-pass circuit 40 is employed. Thus, within any given cycle, e.g., denitrification, DO controller 58 can open and close solenoid valve 42 depending upon the oxygen level in aerobic chamber 18, i.e., is chamber 18 in an anoxic condition? If it is not in an anoxic condition, DO controller 58 would signal solenoid valve 42 to close thereby starving the aerobic chamber 18 of at least some of the oxygen and would keep solenoid valve 42 closed until an anoxic condition was restored in aerobic chamber 18. In like fashion, DO controller 58, during the aerobic treatment cycle, could ensure that just enough but not a surplus of oxygen was present in aerobic chamber 18, again by selectively opening and closing solenoid valve 42. The advantage of the embodiment of FIG. 4 over that shown in FIG. 3, is that since pump 36 is continuously running, there is a continuous supply of air/oxygen into aerobic chamber 18 either via solenoid valve 42 or flow restrictor 52. Thus, even when solenoid 42 is closed, there is sufficient flow through flow restrictor 52 to maintain enough circulation in aerobic chamber 18 to prevent or at least minimize settling of solids which as noted above is detrimental to the efficiency of the denitrification process.

In the embodiments shown in FIGS. 3 and 4, there is a system monitor 66 which is connected via a connector 64 to DO monitor 58. System monitor 66 can take the form of the system disclosed in U.S. patent application Ser. No. 10/003, 633 filed Nov. 2, 2001 and entitled Regulatory Compliance System And Method which is incorporated herein by reference for all purposes. Thus, system monitor 66 could communicate to a service company, the owner of the AWTS, a regulatory authority, etc., whether the DO probe 56 or for that matter other components of the system were operative, what the DO level is in aerobic chamber 18, etc.

It will be appreciated that some of the various components, e.g., timer/controller 38, DO controller 58 could be incorporated into a single chip and indeed such a chip could incorporate system monitor 66.

It will be understood that nitrogen nutrient removal in a wastewater system is relatively complex as set forth more fully in *Wastewater Engineering, Treatment, Disposal and Reuse, Metcalf and Eddy, Inc.*, Third Edition, Section 8.11, incorporated by reference herein for all purposes. Basically nitrogen removal goes through a nitrification-denitrification process, nitrification being the first step. In the nitrification stage, ammonia is converted to nitrite which in turn is converted to nitrate by the appropriate nitrification, denitrification bacteria, respectively. In denitrification, nitrate is converted to nitrogen gas under anoxic conditions as described above.

In terms of determining nitrogen nutrients, sometimes referred to as total nitrogen in treated effluent, reference is made to NSF/ANSI 40-2000, and more specifically to APHA, *Standard Methods for the Examination of Water and Wastewater*, 20$^{th}$ Edition published by American Public Health Association (APHA, 800 One Street, N.W., Washington D.C. 2001, all of which is incorporated herein by reference for all purposes. Suffice to say that in making the empirical measurements to carry out the process and use the apparatus of the present invention, the total nitrogen for a given AWTS at a given site can be readily determined by methods well known to those skilled in the art, as set forth above, and such measurements can be used, as described above, to ensure that, using the method and/or apparatus of the present invention, one can achieve efficient removal of nitrogen nutrients.

The foregoing description and examples illustrate selected embodiments of the present invention. In light thereof, variations and modifications will be suggested to one skilled in the art, all of which are in the spirit and purview of this invention.

What is claimed is:

1. In an aerobic wastewater treatment system comprising an aerobic digestion tank, said aerobic digestion tank defining an aeration chamber and a clarifier chamber, and a pump for introducing an oxygen-containing gas into treated wastewater in said aeration chamber, the improvement comprising:
    a feedline operatively connected to said pump for introducing said oxygen-containing gas into said treated wastewater and said aeration chamber;
    a by-pass circuit, said by-pass circuit having an inlet and an outlet, said outlet being connected to said feedline, said inlet being connected to said pump, said by-pass circuit including a first branch line and a second branch line, said first and second branch lines being in open communication with said pump and said feedline;
    a solenoid valve disposed in said first branch line;
    a flow restrictor disposed in said second branch line;
    a timer/controller connected to said solenoid valve and being operative to open and close said solenoid valve for predetermined periods of time whereby when said solenoid valve is closed, flow from said pump passes through said second branch line and said flow restrictor, said pump running continuously during periods when said solenoid valve is open and when said solenoid valve is closed.

2. In an aerobic wastewater treatment system comprising an aerobic digestion tank, said aerobic digestion tank defining an aeration chamber and a clarifier chamber and a pump for introducing an oxygen-containing gas into treated wastewater in said aeration chamber, the improvement comprising:
    a dissolved oxygen probe disposed in said treated wastewater in said aeration chamber;
    a dissolved oxygen controller connected to said dissolved oxygen probe;
    a pump for introducing said oxygen-containing gas into said treated wastewater in said aeration chamber;
    a timer/controller connected to said dissolved oxygen controller, said timer/controller serving to determine macro operation of said pump for predetermined periods of time, said dissolved oxygen probe being operative to effect micro control of said pump during said predetermined periods of time depending upon the dissolved oxygen in said treated wastewater in said aeration chamber as determined by said dissolved oxygen probe.

3. In an aerobic wastewater treatment system comprising an aerobic digestion tank, said aerobic digestion tank defining an aeration chamber and a clarifier chamber and a pump for introducing an oxygen-containing gas into treated wastewater in said aeration chamber, the improvement comprising:
    a dissolved oxygen probe disposed in said treated wastewater in said aeration chamber;
    a dissolved oxygen controller connected to said dissolved oxygen probe;
    a pump for introducing said oxygen-containing gas into said treated wastewater in said aeration chamber;
    a feedline operatively connected to said pump for introducing said oxygen-containing gas into said treated wastewater in said aeration chamber;
    a by-pass circuit having an inlet and an outlet, said outlet being connected to said feedline, said inlet being connected to said pump, said by-pass circuit including a first branch line and a second branch line, said first and second branch lines being in open communication with said pump and said feedline;
    a solenoid valve disposed in said first branch line, said dissolved oxygen controller being connected to said solenoid valve;
    a flow restrictor disposed in said second branch line;
    said dissolved oxygen controller being operative to effect opening and closing of said solenoid valve depending upon the dissolved oxygen in said treated wastewater in said aeration chamber as determined by said dissolved oxygen probe, said pump running continuously regardless of whether said solenoid valve is in said open or closed position.

* * * * *